US008292187B2

(12) United States Patent
Getliff

(10) Patent No.: US 8,292,187 B2

(45) Date of Patent: Oct. 23, 2012

(54) USE OF RADIO FREQUENCY IDENTIFICATION TAGS TO IDENTIFY AND MONITOR SHAKER SCREEN LIFE AND PERFORMANCE

(75) Inventor: Jonathan Getliff, Kincardineshire (GB)

(73) Assignee: M-1 L.L.C., Houston, TX (US)

( * ) Notice: Subject to any disclaimer, the term of this patent is extended or adjusted under 35 U.S.C. 154(b) by 0 days.

(21) Appl. No.: 12/596,402

(22) PCT Filed: Apr. 15, 2008

(86) PCT No.: PCT/US2008/060370

§ 371 (c)(1), (2), (4) Date: Mar. 11, 2010

(87) PCT Pub. No.: WO2008/130939

PCT Pub. Date: Oct. 30, 2008

(65) Prior Publication Data

US 2010/0193584 A1 Aug. 5, 2010

Related U.S. Application Data

(60) Provisional application No. 60/912,858, filed on Apr. 19, 2007.

(51) Int. Cl.
*G06K 19/06* (2006.01)

(52) U.S. Cl. ......................... 235/491; 235/492; 235/375

(58) Field of Classification Search .................. 235/375, 235/491, 492
See application file for complete search history.

(56) References Cited

U.S. PATENT DOCUMENTS 4,582,597 A 4/1986 Huber
4,613,432 A 9/1986 Racine et al.
4,810,372 A 3/1989 Jones
4,968,366 A 11/1990 Hukki et al.

(Continued)

FOREIGN PATENT DOCUMENTS

WO 2007/045922 A1 4/2007

OTHER PUBLICATIONS

PCT Notification Concerning Transmittal of International Preliminary Report on Patentability (Chapter I of the Patent Cooperation Treaty) with Written Opinion of the International Searching Authority for related Application No. PCT/US2008/060370; dated Oct. 29, 2009 (4 pages).

(Continued)

*Primary Examiner* — Kristy A Haupt
(74) *Attorney, Agent, or Firm* — Osha Liang LLP

(57) ABSTRACT

A method of operating a shaker including: disposing a shaker screen in a shaker, wherein the shaker screen includes at least one tag selected from the group consisting of a radio frequency identification tag and a surface acoustic wave tag; reading shaker screen information from the at least one tag; and adjusting at least one shaker variable using the shaker screen information. In another aspect, embodiments relate to a shaker screen including: a filtering element disposed on a frame; wherein the frame includes: at least one outer frame member; at least one cross member; and at least one tag selected from the group consisting of a radio frequency identification tag and a surface acoustic wave tag; wherein at least a portion of the tag is integral with at least one of an outer frame member and a cross member. Also disclosed is a method of manufacturing a shaker screen having an integral tag.

3 Claims, 7 Drawing Sheets

U.S. PATENT DOCUMENTS

| | | | |
|---|---|---|---|
| 5,221,008 | A | 6/1993 | Derrick, Jr. et al. |
| 5,226,546 | A | 7/1993 | Janssens et al. |
| 5,265,730 | A | 11/1993 | Norris et al. |
| 5,335,784 | A | 8/1994 | Tyler |
| 5,853,583 | A | 12/1998 | Shah |
| 6,094,173 | A | 7/2000 | Nylander |
| 6,166,706 | A | 12/2000 | Gallagher, III et al. |
| 6,513,664 | B1 | 2/2003 | Logan et al. |
| 6,513,665 | B1 | 2/2003 | Hukki et al. |
| 6,722,504 | B2 | 4/2004 | Schulte et al. |
| 6,759,000 | B2 | 7/2004 | Cook et al. |
| 6,863,183 | B2 | 3/2005 | Schulte et al. |
| 7,170,415 | B2 | 1/2007 | Forster |
| 7,173,515 | B2 | 2/2007 | Ohki et al. |
| 7,180,228 | B2 | 2/2007 | Masuko et al. |
| 7,180,388 | B2 | 2/2007 | Matsuda et al. |
| 7,180,423 | B2 | 2/2007 | Forster et al. |
| 7,183,619 | B2 | 2/2007 | Sugiura |
| 7,484,625 | B2 | 2/2009 | Scott et al. |
| 2004/0118754 | A1 | 6/2004 | Hunter et al. |
| 2006/0108113 | A1 | 5/2006 | Scott et al. |
| 2006/0243643 | A1 | 11/2006 | Scott et al. |

OTHER PUBLICATIONS

International Search Report for PCT/US2008/060370 mailed Aug. 28, 2008 (2 pages).

Written Opinion of ISA for PCT/US2008/060370 mailed Aug. 28, 2008 (4 pages).

Examination Report issued in corresponding British Application No. GB0919754.2; Dated Nov. 18, 2011(2 pages).

Examination Report issued in corresponding British Application No. GB0919754.2; Dated Jun. 3, 2011 (2 pages).

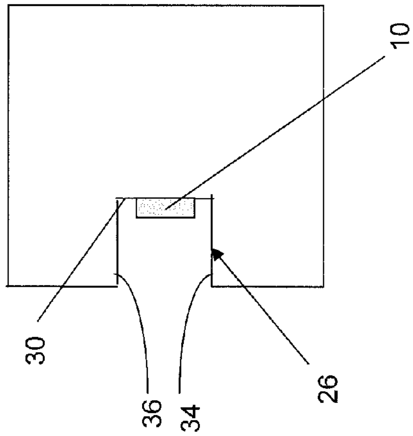
Figure 1D (end view)
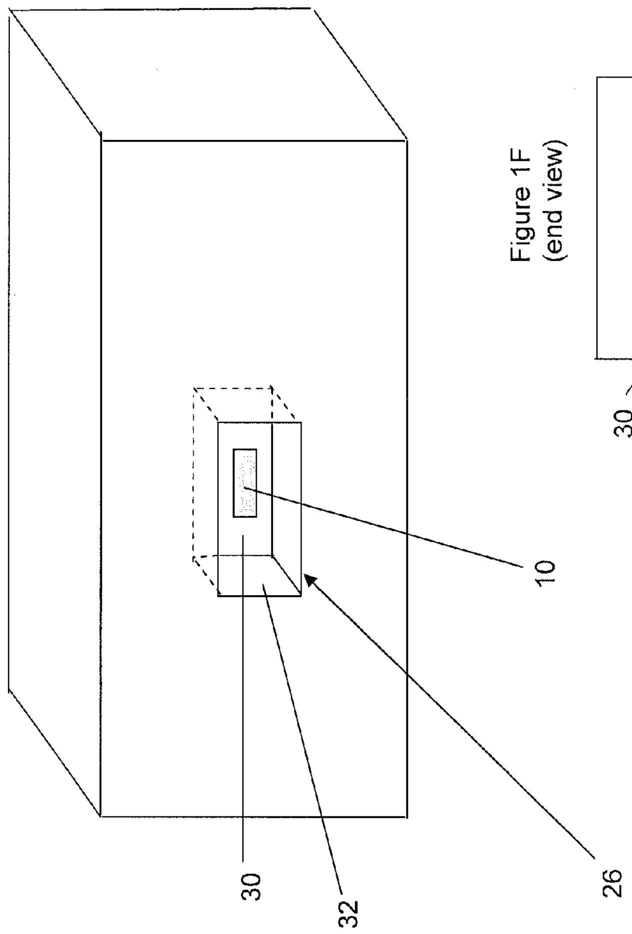
Figure 1E (side view)
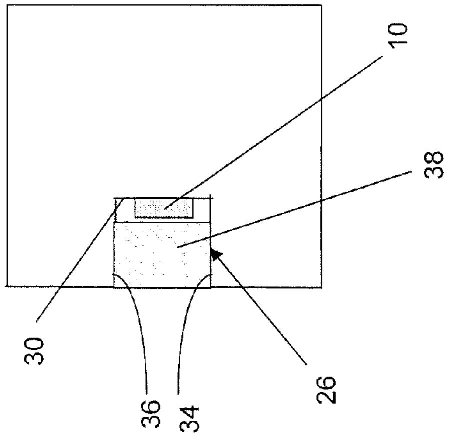
Figure 1F (end view)

USE OF RADIO FREQUENCY IDENTIFICATION TAGS TO IDENTIFY AND MONITOR SHAKER SCREEN LIFE AND PERFORMANCE

BACKGROUND OF DISCLOSURE

1. Field of the Disclosure

Embodiments disclosed herein relate generally to shale shakers, shaker screens, and uses thereof. More specifically, embodiments disclosed herein relate to shakers and shaker screens including radio frequency identification tags (RFIDT's) or surface acoustic wave tags (SAWT's), readers for tags, and uses thereof.

2. Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures, thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates must be removed.

One type of apparatus that removes cuttings and other solid particulates from drilling mud is commonly referred to in the industry as a "shale shaker." A shale shaker, also known as a vibratory separator, is a vibrating sieve-like table upon which returning used drilling mud is deposited and through which drilling mud containing substantially less drill cuttings emerges. Typically, the shale shaker is an angled table with a generally perforated filter screen bottom. Returning drilling mud is deposited at the top of the shale shaker. As the drilling mud travels along the incline toward the lower end, the fluid falls through the perforations to a reservoir below, thereby leaving the solid particulate material behind. The combination of the angle of inclination with the vibrating action of the shale shaker table enables the solid particles left behind to flow until they fall off the end of the shaker table. Preferably, the amount of vibration and the angle of inclination of the shale shaker table are adjustable to accommodate various drilling mud flow rates and particulate percentages in the drilling mud. After the fluid passes through the perforated bottom of the shale shaker, it may either return to service in the borehole immediately, be stored for measurement and evaluation, or pass through an additional piece of equipment (e.g., a drying shaker, a centrifuge, or a smaller sized shale shaker) to remove smaller cuttings and/or particulate matter.

Because shale shakers are typically in continuous use, repair operations, and associated downtimes, need to be minimized as much as possible. Often, the filter screens of shale shakers, through which the solids are separated from the drilling mud, wear out over time and subsequently require replacement. Therefore, shale shaker assemblies (i.e., filter screens and screen frames) are typically constructed to be easily removable and quickly replaceable. Generally, through the loosening of several bolts or wedges, the screen assembly may be lifted out of the shaker and replaced within a matter of minutes. While there are numerous styles and sizes of screen assemblies and filter screens, they generally follow similar design. Typically, screen assemblies include a perforated plate base upon which a wire mesh, or other perforated filter overlay, is positioned. The perforated plate base generally provides structural support and allows the passage of fluids therethrough, while the wire mesh overlay defines the largest solid particle capable of passing therethrough. While many perforated plate bases are flat or slightly arched, it should be understood that perforated plate bases having a plurality of corrugated or pyramid-shaped channels extending thereacross may be used instead. The pyramid-shaped channels may provide additional surface area for the fluid-solid separation process to take place while guiding solids along their length toward the end of the shaker.

A typical screen assembly includes a plurality of hold-down apertures at opposite ends of the filter screen. These apertures, preferably located at the ends of the screen assembly that will abut walls of the shale shaker, allow hold down retainers of the shale shaker to grip and secure the screen assembly in place. However, because of their proximity to the working surface of the screen assembly, the hold-down apertures must be covered to prevent solids in the returning drilling fluid from bypassing the filter mesh through the hold-down apertures. To prevent such bypass, an end cap assembly is placed over each end of the screen assemblies to cover the hold-down apertures. Presently, these caps are constructed by extending a metal cover over the hold down apertures and attaching a wiper seal thereto to contact an adjacent wall of the shale shaker. Furthermore, epoxy plugs are set in each end of the end cap to prevent fluids from communicating with the hold-down apertures through the sides of the end cap.

Typically, screen assemblies used with shale shakers are placed in a generally horizontal fashion on a substantially horizontal bed or support structure located within a basket in the shaker. The screens themselves may be flat, nearly flat, corrugated, depressed, and/or contain raised surfaces. The basket in which the screen assemblies are mounted may be inclined towards a discharge end of the shale shaker. The shale shaker imparts a rapidly reciprocating motion to the basket and the screen assemblies. Drilling mud, from which particles are to be separated, is poured onto a back end of the vibrating screen. The drilling mud generally flows toward the discharge end of the basket. Large particles that are unable to pass through the screen remain on top of the screen, and move toward the discharge end of the basket where they are collected. Smaller particles and fluid pass through the screen and collect in a bed, receptacle, or pan therebeneath.

In some shale shakers, a fine screen cloth is used with the vibrating screen assembly. The screen assembly may have two or more overlying layers of screen cloth or mesh. Layers of cloth or mesh may be bonded together and placed over a support, multiple supports, a perforated plate, or an apertured plate. The frame of the vibrating screen assembly is resiliently suspended or mounted upon a support, and is caused to vibrate by a vibrating mechanism (e.g., an unbalanced weight on a rotating shaft connected to the frame). Each screen assembly may be vibrated to create a flow of trapped solids on top surfaces of the screen for removal and disposal thereof The fineness or coarseness of the mesh of a screen may vary depending upon mud flow rate and the size of the solids to be removed.

As described above, the type of solids to be separated may change throughout the drilling process. Depending on the type and construction of the formation to be drilled, the solids encountered may change in composition, size, and density. As a result, the flow of the drilling fluid through and across a screen may change due to composition, tackiness, size, and other spent drilling fluid properties known to those skilled in the art. Similarly, as a shaker screen wears, flow and separation of solids through and across the screen may change.

U.S. Patent Application Publication Nos. 20060243643 and 20060108113 discloses shale shakers and shaker screen assemblies having radio frequency identification tags (RFIDT's) or surface acoustic wave tags (SAWT's) (collectively referred to herein as "tags") disposed thereon. The tags may be removably attached to a portion of the shaker screen frame, such as a recess formed in a frame member, and may be used for purposes including relaying screen information and inventory control. The tags may also be used by a control system to determine whether a particular screen assembly is suitable for use on a particular shaker. If a screen assembly unsuitable for use is installed on a shaker, the control system can automatically shut down the shaker.

Disposing a tag on a screen frame, especially removably disposing tags on shaker screen frames, may result in an undesired level of maintenance with respect to the tags. Due to the vibratory nature of the shakers, vibrations may result in failure of the attachment, encasement, tape, or protective covering used to hold the tag to the screen frame. These failures may result in detachment of a tag, tag failure, or the exposure of the tags to fluids and chemicals during operation of the shaker.

Accordingly, there exists a need for shakers and screen frames that may allow for improved separations and separation control throughout the drilling process. There also exists a need for tagged screen assemblies that may withstand the rigors of a vibratory separator.

SUMMARY OF DISCLOSURE

In one aspect, embodiments disclosed herein relate to a method of operating a shaker including: disposing a shaker screen in a shaker, wherein the shaker screen includes at least one tag selected from a group consisting of a radio frequency identification tag and a surface acoustic wave tag; reading shaker screen information from the at least one tag; and adjusting at least one shaker variable using the shaker screen information.

In another aspect, embodiments disclosed herein relate to a shaker screen including: a filtering element disposed on a frame; wherein the frame includes: at least one outer frame member; at least one cross member; and at least one tag selected from the group consisting of a radio frequency identification tag and a surface acoustic wave tag; wherein at least a portion of the tag is integral with at least one of an outer frame member and a cross member.

In another aspect, embodiments disclosed herein relate to a method of manufacturing a shaker screen including: forming a frame, wherein the frame includes: at least one outer frame member; at least one cross member; and integrating at least a portion of a tag with at least one of an outer frame member and a cross member, wherein the tag is selected from the group consisting of a radio frequency identification tag and a surface acoustic wave tag; and disposing a filtering element on the frame.

Other aspects and advantages will be apparent from the following description and the appended claims.

BRIEF DESCRIPTION OF DRAWINGS

FIGS. 1A-1F illustrate various embodiments of a tag disposed on a screen assembly according to embodiments disclosed herein.

DETAILED DESCRIPTION

Figure 1A:
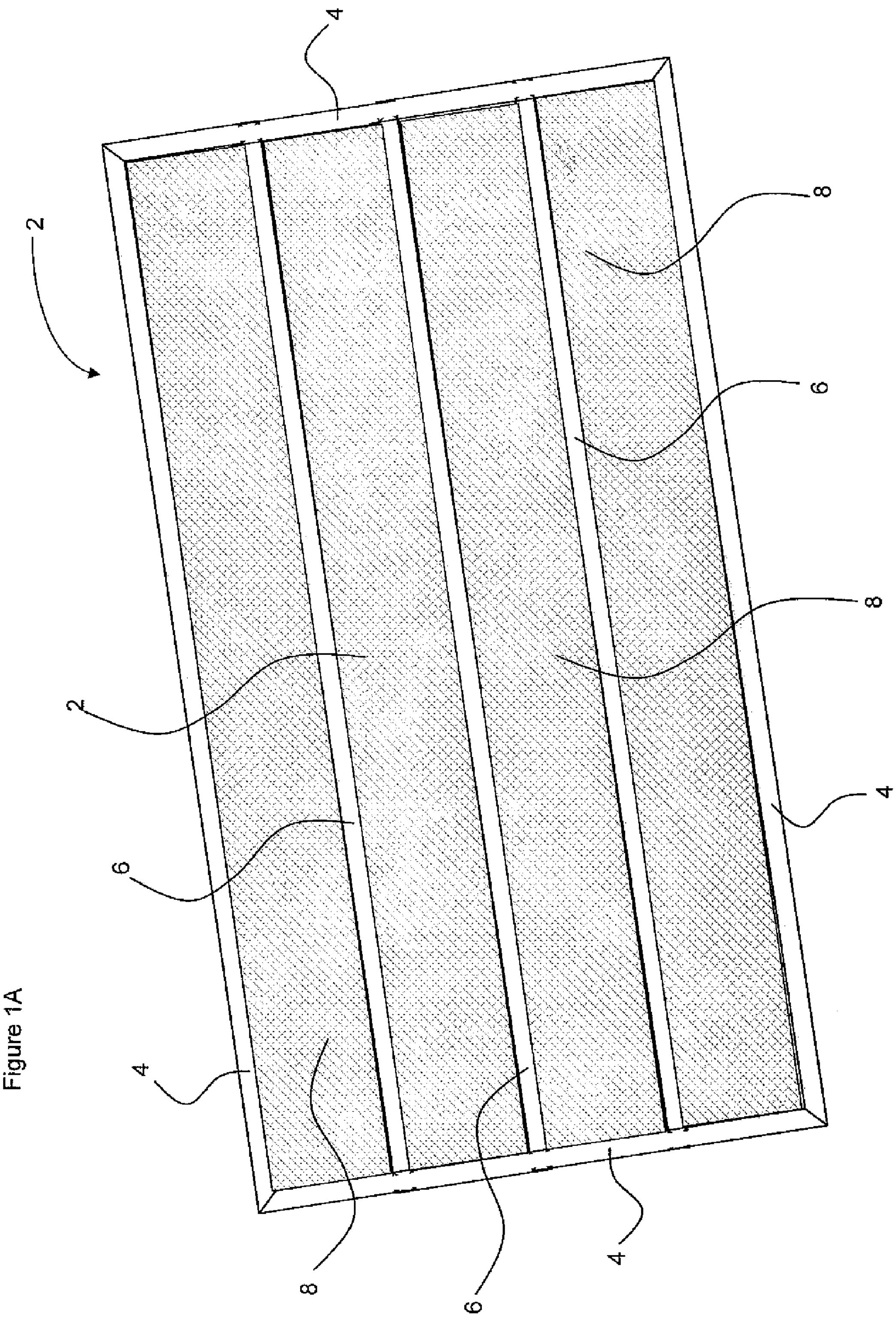

In one aspect, embodiments disclosed herein relate to a method of operating a shaker. More specifically, embodiments disclosed herein relate to a method of operating a shaker based upon particular aspects of a screen assembly disposed in the shaker.

In some embodiments, radio frequency identification tags (RFIDT's) or surface acoustic wave tags (SAWT's) (collectively referred to herein as "a tag" or "tags") may be used to relay screen assembly information to a control system, and this information may be used by the control system to adjust operating variables of the shaker. Shaker operating variables, such as motor speed, energy imparted to the screen, screen angle, vibration frequency, type of motion, angle of motion, and other shaker operating variables, may be adjusted so as to account for screen wear, screen type, mesh size, and other screen assembly variables, and to account for variations in drilling fluid compositions and the related properties encountered throughout the drilling process. In this manner, efficiency of the separations performed by the shaker may be controlled or enhanced throughout the drilling process.

In another aspect, embodiments disclosed herein relate to a screen assembly having at least one tag. In some embodiments, the screen assembly, including the screen, support members, and the screen frame, may be integral with the tag. As used herein, "integral" refers to the screen, support members, or frame and the tag being parts of a whole, i.e., an integral screen frame/tag or an integral screen assembly/tag. That is, a tag, or portions thereof, may be formed into or may be formed by portions of the screen or screen frame, not merely disposed on or disposed within a cavity in the screen or screen frame. A tag integral with a screen or screen frame, for example, may result in improved integrity of the tags used with the screen or screen frame.

Tags

Tags useful in embodiments disclosed herein include RFIDT's and SAWT's. For example, RFIDT's typically include a radio frequency identification (RFID) element, where the RFID element is a either a resonant circuit or an antenna tuned to a frequency, that includes an integrated circuit having a memory containing information associated with the tagged item. Examples of RFIDT's are described in, for example, U.S. Pat. Nos. 7,180,423, 7,173,515, and 7,170,415, among others. These patents are hereby incorporated by reference.

The conventional SAWT has a surface acoustic wave chip, which is hermetically sealed in a cavity. The SAW chip includes a piezoelectricity device substrate on which interdigital transducers having comb-like electrodes are formed. The transducers, on the input side, convert an applied electrical signal into a SAW, which propagates on the piezoelectric substrate. The transducers, on the output side, convert the received SAW into an electrical signal that has been subjected to a given modulation. Examples of SAWT's are described in, for example, U.S. Pat. Nos. 7,183,619, 7,180,388, and 7,180,228, among others. These patents are hereby incorporated by reference.

In some embodiments disclosed herein, components of the RFIDT's and SAWT's may be contained within a housing. For example, an RFIDT housing may encase the RFID element, the antenna, the resonant circuit, and/or the integrated circuit. In other embodiments, components of the RFIDT's and SAWT's may be located external to a housing encasing some tag components. In yet other embodiments, the components of the tags may be provided without a housing.

Tag systems typically use one or more reader antennae to send signals to RFIDT or SAWT tagged items, such as radio frequency (RF) or surface acoustic wave (SAW) signals. The use of such tags to identify an item or person is well known in the art. In response to the signals from a reader antenna, the tags, when excited, produce a disturbance in the magnetic field (or electric field) that is detected by the reader antenna. Typically, such tags are passive tags that are excited or resonate in response to the signal from a reader antenna when the tags are within the detection range of the reader antenna. One example of such an RFIDT system including details of suitable RF antennae is described in U.S. Pat. No. 6,094,173, the contents of which are incorporated by reference herein in their entirety. In order to improve the detection range and expand "coverage" it is known to use coplanar antennae that are out of phase. One example of such an antenna is provided in U.S. Pat. No. 6,166,706, the contents of which are hereby incorporated by reference.

The detection range of the tag systems is typically limited by signal strength to short ranges. For example, detection ranges may be less than about one foot for 13.56 MHz systems. Therefore, portable reader units may be moved past a tagged item in order to read the tag. For example, a portable reader may be used to obtain information from tagged screen assemblies disposed in a shaker in accordance with embodiments disclosed herein.

In another embodiment, multiple small reader antennae may be used. For example, antennae may be located proximate a shaker having tagged screen assemblies. Additionally, a shaker may include one or more reader antennae, such as antennae located on the shaker basket proximate a location of a screen assembly. In some embodiments, a shaker basket may include one or more reader antennae for each section containing a separate screen assembly. In this manner, the reader antennae may obtain information from tagged screen assemblies disposed in the shaker.

Tags disposed on or integral with screen assemblies useful in embodiments disclosed herein may include screen assembly data. Data such as manufacturer, screen assembly type, screen mesh size, screen configuration/shape, time in service, wear, and other screen assembly information as may be relevant or required by end users.

Additionally, in some embodiments, tags disposed in or integral with screen assemblies may be read-only. In other embodiments, tags disposed in or integral with screen assemblies may be read-write. In selected embodiments, information may be written to read-write tags. For example, information stored in the tag regarding time in service or observed wear may be updated periodically. In this manner, information obtained from the tag is up-to-date during subsequent readings.

Screen Assemblies

FIGS. 1A-E illustrate screen assemblies according to embodiments disclosed herein. Referring now to FIG. 1A, one or more tags (not shown) may be disposed on any portion of a screen assembly 2, including outer frame members 4, cross support members 6, screen 8, or any other structural part of a screen assembly 2.

Figure 1C:
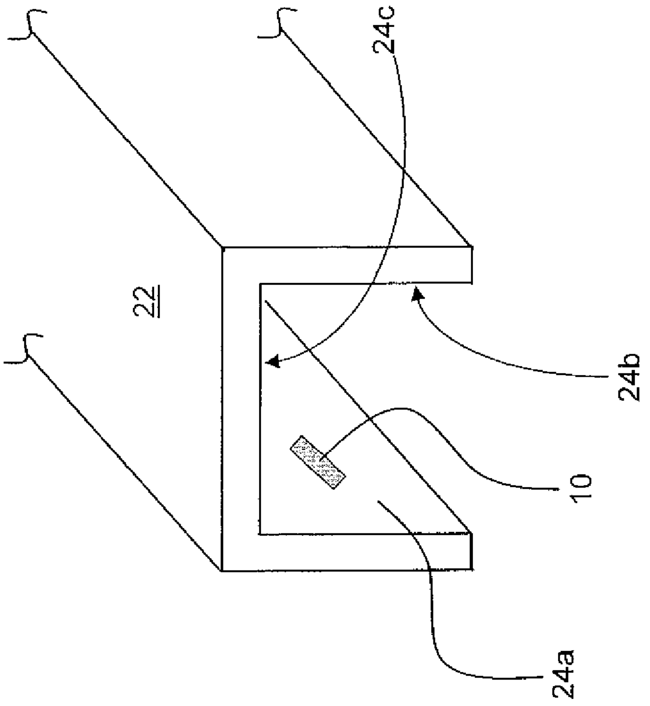
Figure 1B:
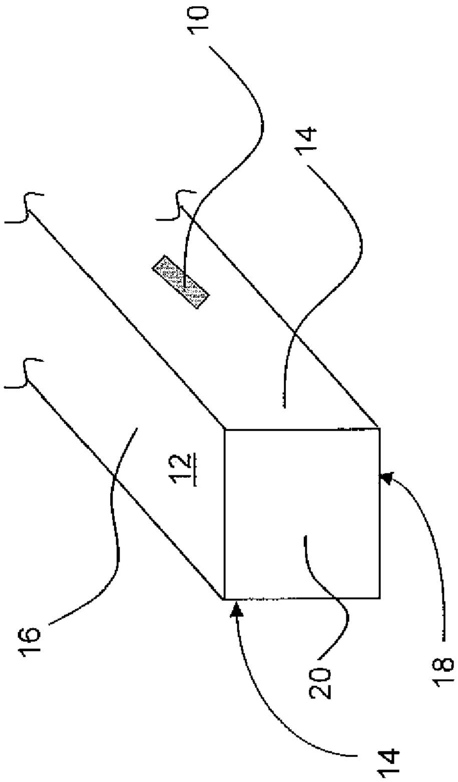

Referring now to FIG. 1B, in one embodiment, a tag 10 may be disposed on a support member 12, which may include outer frame members and cross support members. As illustrated, tag 10 is disposed on a side surface 14 of support member 12. In other embodiments, tag 10 may be disposed on a top surface 16, a bottom surface 18, or an end surface 20.

Referring now to FIG. 1C, in another embodiment, a shaped support member 22 of a screen assembly 2 is illustrated. For example, a support member 22 of a screen assembly 2 may be "C" shaped, as illustrated, thereby providing structural support to a screen assembly 2 while decreasing the amount of material used to form the shaped support member 22. One of ordinary skill in the art would appreciate that other shapes may also be used. Tag 10 may be disposed on an interior surface 24 of shaped support member 22, including side surfaces 24*a*, 24*b*, or top interior surface 24*c*. In this manner, the potential for exposure of a tag 10 to drilling fluids, and other fluids, may be minimized or eliminated.

As another example, referring now to FIG. 1D and FIG. 1E, a support member 28 of a screen assembly 2 having a recess is illustrated. A recess 26 in a support member 28 may be rectangular in shape, as illustrated, or may be any other shape. In some embodiments, a tag 10 may be disposed on a back surface 30 of recess 26. In other embodiments, a tag 10 may be disposed on a side, bottom, or top surface (32, 34, and 36, respectively) of recess 26. In yet other embodiments, as illustrated in FIG. 1F, a plug or cover 38 may be placed in recess 26 to minimize or eliminate the potential for exposure of tag 10 to fluids or other deleterious material.

Figure 2A:
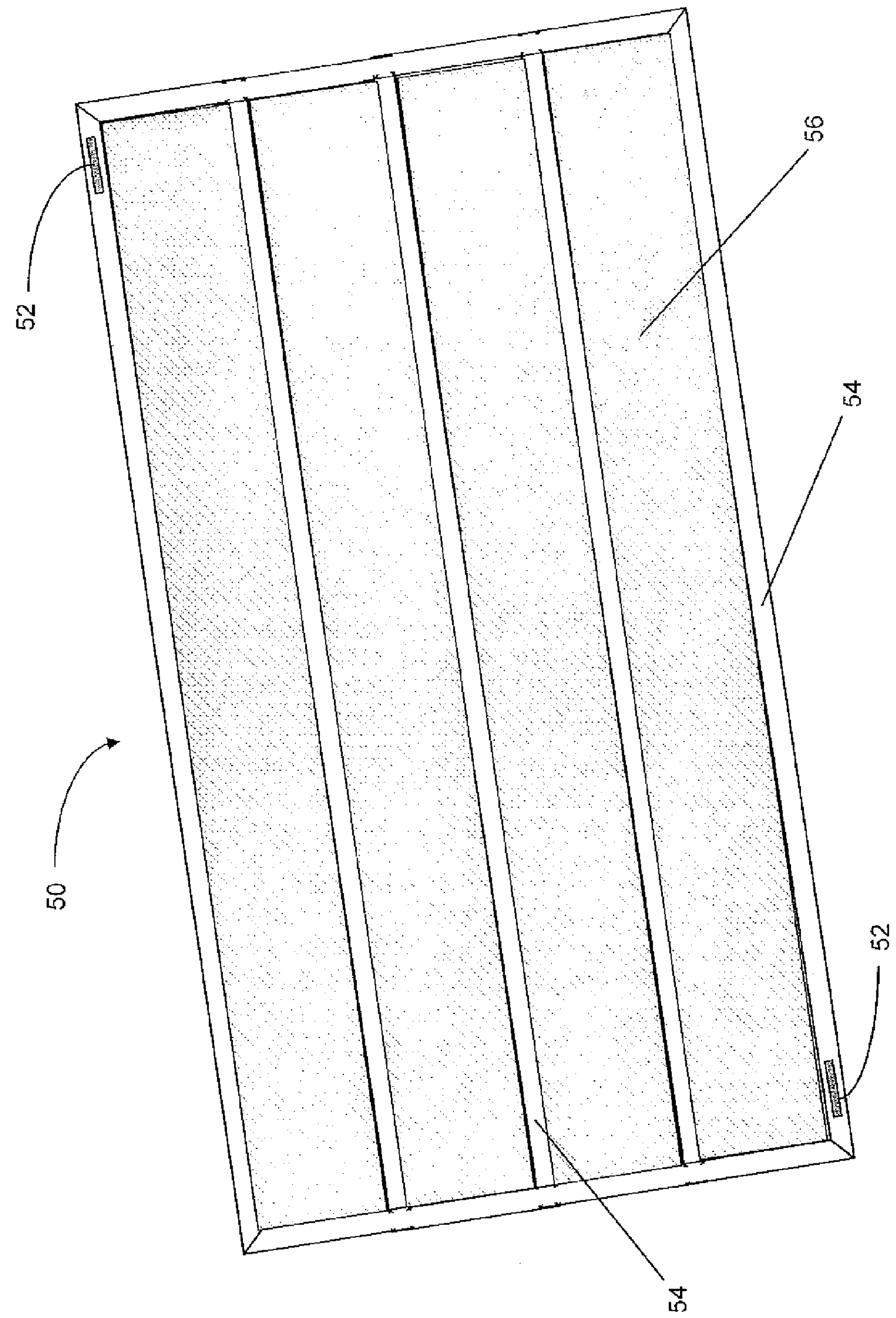
FIGS. 2A-2C illustrate various embodiments of an integral screen frame/tag according to embodiments disclosed herein.
Figure 2B:
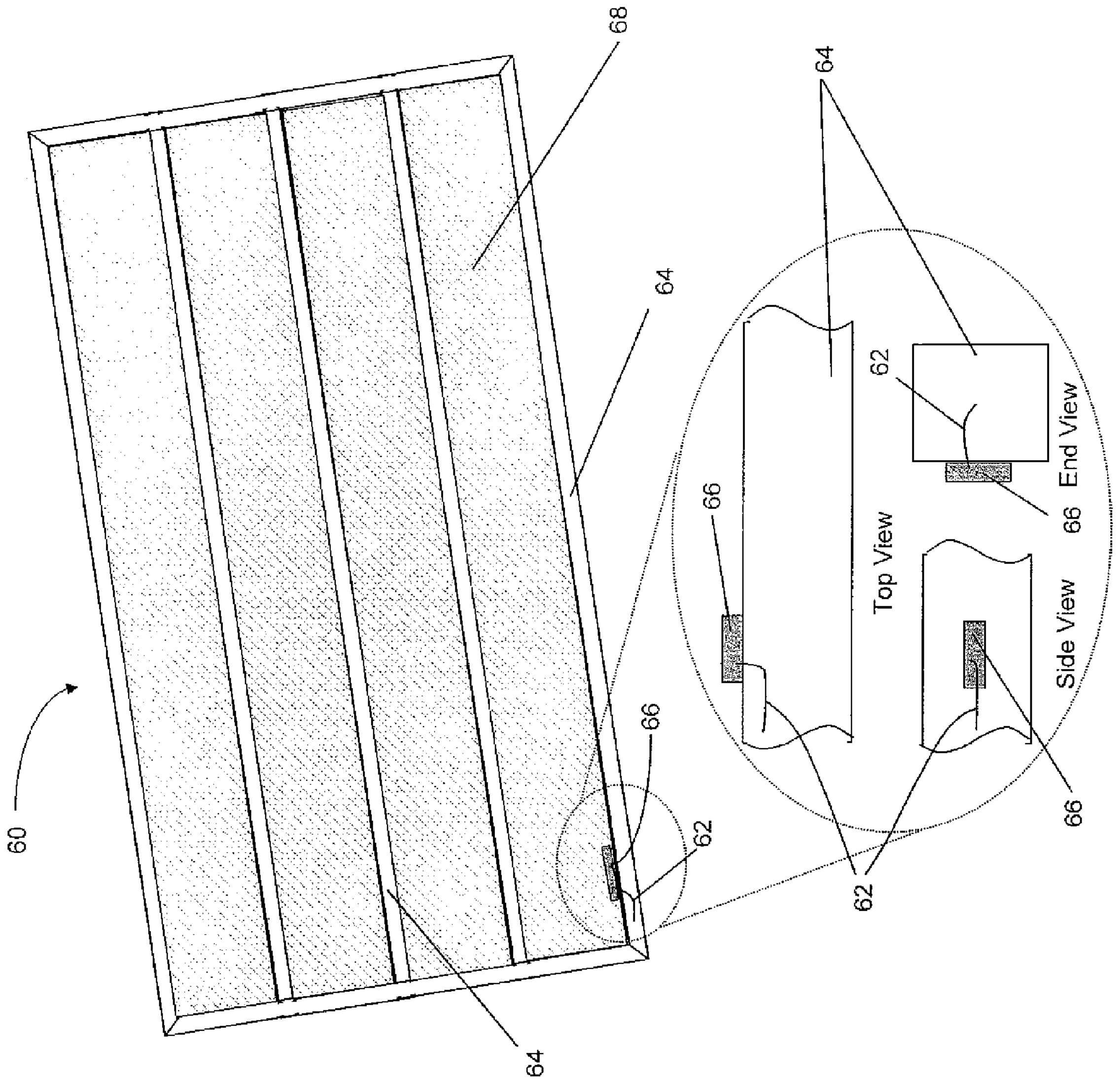
Figure 2C:
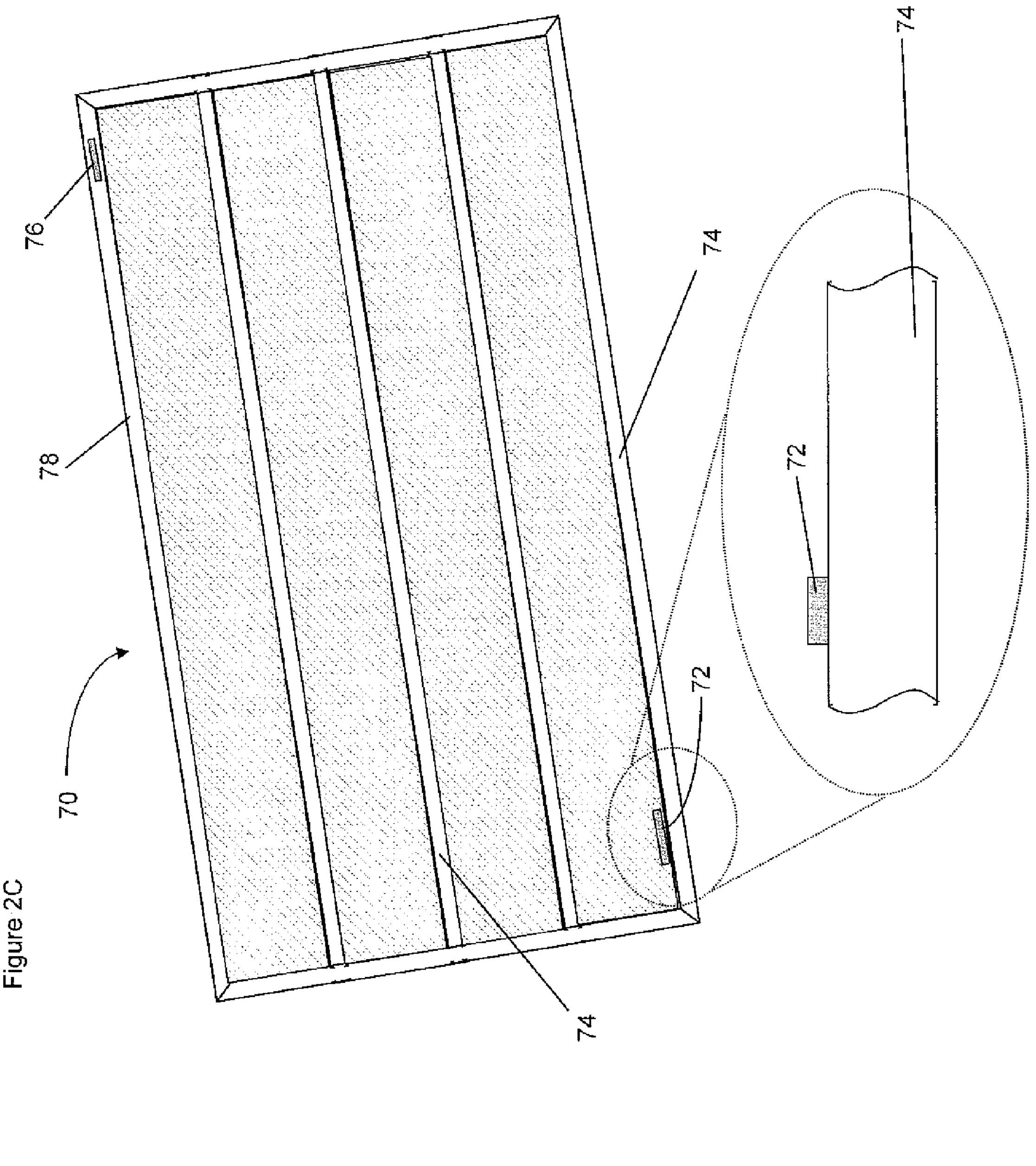

Referring now to FIGS. 2A-C, an integral screen assembly/tag 50, 60, 70 according to embodiments disclosed herein, is illustrated. As described briefly above, "integral" refers to the screen, support members, or frame and the tag being parts of a whole, i.e., an integral screen frame or an integral screen. That is, the tag, or portions thereof, may be formed into or may be formed by portions of the screen or screen frame, not merely disposed on or within the screen or screen frame.

As illustrated in FIG. 2A, an integral screen assembly 50 may include at least one tag 52 integral with a support member 54. For example, a tag 52 including a housing (not shown) may be encapsulated by a composite screen frame 54 during the molding and manufacture of screen assembly 50. In other embodiments, a composite screen frame 54 may also function as a housing for tag components (not shown), including chips, antenna, transducers, and other tag components known in the art.

Referring now to FIG. 2B, an integral screen assembly 60 may include an antenna 62 integral with a support member 64. Antenna 62 may be operatively coupled to tag 66. For example, antenna 62 may be encapsulated by a composite screen support member 64 during the molding and manufacture of screen assembly 60. Subsequently, tag 66 may be disposed on support member 64 and operatively coupled to antenna 62.

Referring now to FIG. 2C, an integral screen assembly 70 may include a tag 72 disposed on a support member 74. In this embodiment, support member 74, in addition to providing structure and support to screen assembly 70, may additionally function as an antenna. The conductivity of member 74 may be such that a tag 72 may be operatively coupled to support member 74, resulting in support member 74 serving as an antenna for tag 72. For example, a support member 74 may be formed from a composite material that may include conductive additives or other additives such that radio frequencies may be received and/or transmitted by the composite. Similarly, other portions of a screen assembly, such as the screen mesh, may also serve as an antenna for tag 72.

In other embodiments, a tag 76 integral with a support member 78 may be operatively coupled to the support member 78, where support member 78 additionally functions as an antenna for tag 76. Tag 76, for example, may be encapsulated by a composite support member 78, as described above, where the support member functions as an antenna for tag 76. As described with respect to FIGS. 2B and 2C, support members additionally functioning as an antenna may provide increased range and flexibility with respect to tag location.

As mentioned above, in some embodiments, composite screen frames may be used in the manufacture of integral screen assemblies/tags. Referring back to FIG. 1A, a composite frame members 4, 6 may be formed from any material known to one of ordinary skill in the art including, but not limited to, high-strength plastic, mixtures of high-strength plastic and glass, high-strength plastic reinforced with high-tensile-strength steel rods, and any combinations thereof By using composite frame members 4, 6, embodiments of the present disclosure may provide a lighter weight frame with increased durability and strength over conventional steel frames. In some embodiments, composite frame members 4, 6 may be formed with integral wire structures (not shown), as described in U.S. Pat. No. 6,759,000, which is hereby incorporated by reference. Tags may then be disposed on or made integral with frame members 4, 6.

Composite frame members 4, 6 in accordance with embodiments of the present disclosure may be formed by a number a methods known to those of ordinary skill in the art of plastics manufacture. One such method of forming composite frame members 4, 6 may include injection molding and/or gas injection molding. In such an embodiment, a composite or polymeric material may be formed around a wire structure and placed in a mold. The mold may be closed around the wire structure and a liquid polymer injected therein. Upon curing, a force may be applied to opposing sides of the mold thereby allowing the formed frame 4, 6 to separate from the mold. In alternate methods of injection molding, gas may be injected into a mold to create spaces in the composites that may later be filled with alternate materials.

Referring back to FIG. 2A, integral composite frames/tags 50 in accordance with embodiments of the present disclosure may also be formed by a number a methods known to those of ordinary skill in the art of plastics manufacture. One such method of forming integral composite frames/tags 50 may include injection molding and/or gas injection molding. In such an embodiment, a composite or polymeric material may be formed around a wire structure (not shown), and placed in a mold. The mold may be closed around a tag 52 (including the tag housing in some embodiments) or an antenna (such as antenna 62 shown in FIG. 2B) and the wire structure and a liquid polymer injected therein. In some embodiments, the mold may be closed around an RFID or SAW chip or other tag components, where the polymer injected forms the RFID or SAW housing in addition to functioning as a support member 54. Upon curing, a force may be applied to opposing sides of the mold thereby allowing the formed frame to separate from the mold.

Shaker Control

Various shakers, vibratory separators, and screen designs are described in, for example, U.S. Pat. Nos. 6,863,183, 6,722,504, 6,513,665, 6,513,664, 5,853,583, 5,265,730, 4,582,597, 4,613,432, 4,968,366, 5,221,008, 4,810,372, and 5,226,546, among others. These patents describe various shaker designs, shaker control (motion, energy transfer, improving separation efficiency, etc.), and shaker motions, among other various aspects of shakers. For example, U.S. Pat. No. 6,513,664 describes a shaker having dual-motion such that shaker motion may be changed from elliptical to linear motion to accommodate various drilling fluids and solids. As another example, shakers, such as the BEM-650 shaker, available from M-I LLC, Houston, Tex., may allow for adjustment of basket angle or screen deck angle.

Tags, as described above, may be disposed in or formed integrally with a screen assembly. Readers may be disposed proximate to or on shakers or shaker baskets. In some embodiments, information stored in and read from a tag disposed in or integral with a screen assembly may be used by a control system to effect shaker control.

Figure 3:
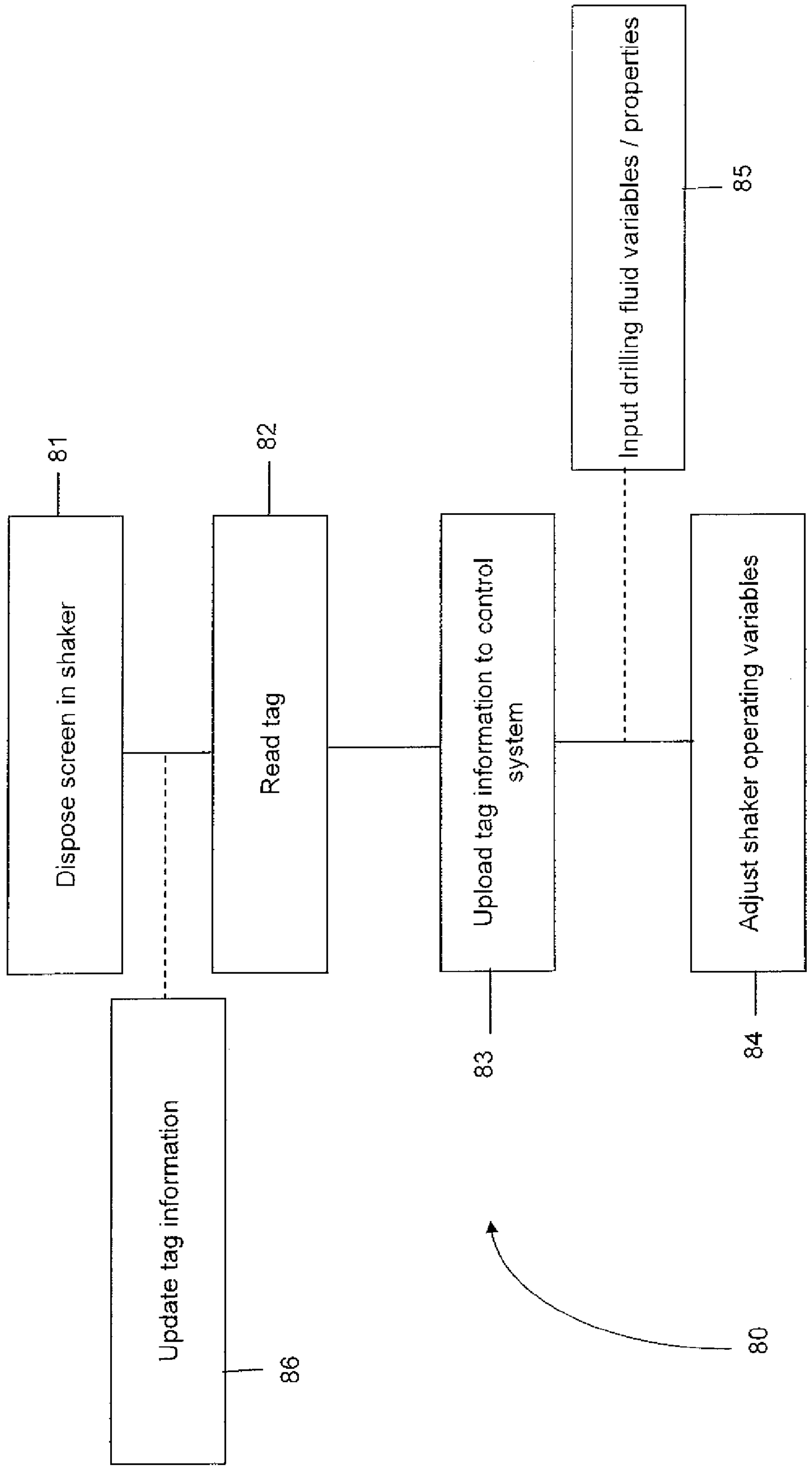
FIG. 3 illustrates a method of controlling a shaker using a tagged screen assembly according to embodiments disclosed herein.

As illustrated in FIG. 3, a method 80 for using tags for shaker control is illustrated. A screen having a tag may be disposed in a shaker in step 81. A reader may then be used to read the tag 82, obtaining information about the screen. The information may then be input or uploaded 83 to a control system. The control system may then adjust 84 shaker operating variables using the information about the screen.

Returning drilling fluid variables may change throughout the drilling process, including solids type, rates, and other variables known to one skilled in the art. Additionally, time in service and wear may affect performance of the screen assembly. In some embodiments, drilling fluid variables or properties may be input 85 into a control system and may be used by the control system in determining what operating variables to adjust in step 84. In other embodiments, tag information may be periodically updated 86 to account for time in service and wear, such as estimated by the control system or using a simple motion sensor mounted on the shale shaker. In other embodiments, a control system may account for time in service via appropriate programming logic.

For example, a tag may include information regarding screen mesh size, screen configuration/shape, screen wear, and other screen assembly variables. Information obtained by reading a tag may be input to a control system, such as a programmable logic controller (PLC), a digital control system (DCS), or rig management system (RMS). Other information transmitted to a control system may include drilling fluid flow rates, particle sizes, drilling fluid compositions, formation type, and others, values for each of which may be actual, measured, or estimated. The control system may use the information obtained from the tags to adjust shaker variables, such as motor speed, energy imparted to the screen, screen deck angle, vibration frequency, type of motion, angle of motion, and other shaker operating variables. The information obtained from the tags may also be used to place upper and/or lower bounds on shaker operating variables, such as an upper limit on motor speed, for example. In this manner, separations and separation efficiency may be controlled and/or optimized as needed for the desired separation of solids from the returning drilling fluid.

Inventory Control

In some embodiments, screens including tags, as described above, may be used for inventory control. Readers may communicate information obtained from screen tags to local and/or remote computer systems. These computer systems may include software that may process data obtained from the numerous readers to provide for inventory control. ONE-TRAX software, a proprietary integrated fluids engineering software program authored by M-I LLC, Houston, Tex., is one example of a software system that may be used to provide inventory control. Other integrated fluids engineering related software or other commercially available inventory control software may also be used with the screens and tags disclosed herein.

For example, an operator may have several drilling rigs in operation concurrently, and it may be desired to efficiently manage the inventory of shaker screens for these several drilling rigs. Readers may routinely obtain information from the several screens in use, in inventory, in transport, and in storage prior to or after use. The information obtained by the readers may then be communicated, directly or by a local computer system, to a system in communication with the several rigs, manufacturers, and warehouses, among others.

Information communicated from the readers or the local systems may include screen status (in use, to be refurbished, in storage, in transport, time in use, condition, etc.) as well as screen information (screen type, size, manufacturer, etc.). This information may then be compiled and organized by the software system, and may be used to estimate projected screen usage and inventory needs for the several rigs, as well as the performance and life of the screens. An operator may then use this compiled information to coordinate ordering and shipment of appropriate screens to and from the several drilling rigs, warehouses, and screen manufacturers in an efficient manner. In this manner, operators may realize cost savings due to improved inventory control and may reduce excess inventory of screens on rigs, which may save valuable space on offshore platforms.

Embodiments disclosed herein may provide for a screen assembly having one or more tags. Advantageously, in some embodiments, information read from the tags may be used in separation control. Control systems may advantageously use screen assembly data to adjust shaker operating variable to achieve the desired separations or to optimize separation efficiency, energy usage, screen wear, and other variables related to shaker operations.

Other embodiments disclosed herein may provide for a screen assembly having one or more integral tags. Integral screen assembly/tags may be more resilient in the vibrational environment than tags merely disposed on or within a screen assembly. Additionally, an integral screen assembly/tag antenna may provide for increased range, allowing tags to be integrated in selected portions of a screen assembly, thereby providing flexibility in the manufacture of the integral screen assemblies as well as flexibility in placement of portable or mounted readers proximate to or on a shaker apparatus for reading of the tags.

Other embodiments may advantageously provide for improved screen inventory control. Information obtained from tags at one or several locations may be communicated to a computer system. This system may include software to compile the information, to project usage and inventory needs, and to coordinate ordering and shipment of screens to desired locations. Improvements in screen inventory control obtained in this manner may result in decreased costs related to screen usage and inventory.

While a limited number of embodiments have been disclosed, those skilled in the art, having benefit of this disclosure, will appreciate that other embodiments can be devised which do not depart from the scope of the present disclosure. Accordingly, the scope of the present disclosure should be limited only by the attached claims.

What is claimed:

1. A method of operating a shaker comprising:

disposing a first shaker screen in a shaker, wherein the first shaker screen comprises at least one tag selected from a group consisting of a radio frequency identification tag and a surface acoustic wave tag;

reading shaker screen information from the at least one tag;

storing the shaker screen information from the at least one tag of the first shaker screen in a software system; and estimating at least one of a projected screen usage, a performance of the screens, and a life of the screens based on the information stored in the software system.

2. The method of claim 1, further comprising:

disposing a second shaker screen in a second shaker, wherein the second shaker screen comprises at least one tag selected from a group consisting of a radio frequency identification tag and a surface acoustic wave tag;

reading shaker screen information from the at least one tag on the second shaker screen; and compiling the shaker screen information from the at least one tag of the second shaker screen with the shaker screen information from the at least one tag of the first shaker screen.

3. The method of claim 2, further comprising coordinating order and shipment of screens based on the compiled information.

* * * * *